United States Patent Office 3,003,998
Patented Oct. 10, 1961

3,003,998
POLYVINYL CHLORIDE RESIN COMPOSITIONS FOR USE IN FOOD PACKAGING
Otto S. Kauder, Jamaica, and Norman L. Perry, Seaford, N.Y., assignors to Argus Chemical Corporation, a corporation of New York
No Drawing. Filed Mar. 15, 1960, Ser. No. 15,058
16 Claims. (Cl. 260—45.75)

This invention relates to polyvinyl chloride resin compositions which when heated retain good initial color and clarity, and which are safe to use in food packaging, stabilized by a combination of calcium benzoate, zinc salts of the mixed fatty acids derived from edible fats and oils, and glycerol.

In recent years a number of patents have issued showing how to stabilize polyvinyl chloride resins using organotin compounds. Among these patents are Nos. 2,883,363, issued April 21, 1959, 2,872,468, issued February 3, 1959, 2,870,182 and 2,870,119, issued January 20, 1959, all to Leistner and Hecker, No. 2,914,506, issued November 24, 1959, to Mack and Parker, and 2,801,258, issued July 30, 1957, to Johnson. Organotin compounds because of their unusual heat stabilizing properties have now set a standard for heat stability which remains unequaled. However, the organotin compounds have the disadvantage that they are toxic, and this limits their use to applications where toxicity is not a problem.

In accordance with the instant invention, polyvinyl chloride resins which are safe for use in food packaging and which retain good initial color and clarity at elevated temperatures are obtained using as the stabilizer system a combination of calcium benzoate, zinc salts of the mixed fatty acids derived from edible fats and oils, and glycerol. The compositions of the invention retain initial color and clarity at the extraordinarily high temperatures which are required in the case of rigid polyvinyl chloride resins as compared to plasticized polyvinyl chloride resins, i.e., at temperatures of 375° F. and higher. They also are safe to use in food packaging, which makes it possible to use the rigid nonplasticized polyvinyl chloride resin compositions of the invention in the fabrication of food containers.

The stabilizer system of the invention is far more effective than any of the ingredients thereof taken alone or in pairs showing that the combination of all three components, i.e., the calcium benzoate, zinc salts of the mixed fatty acids derived from edible fats and oils, and glycerol gives a synergistic effect. Combinations for example, of calcium benzoate and glycerol, of zinc salts and glycerol, and of calcium benzoate and zinc salts, are not sufficiently effective at the elevated processing temperatures, i.e., 375° F. and higher, required in the processing of rigid polymers to be useful stabilizers. Combinations of zinc stearate and glycerol are disclosed in Patent No. 2,711,401 to Robert E. Lally, patented June 21, 1955.

The proportion of the three components of the stabilizer system of the invention are quite critical in obtaining effective stabilization under the required conditions. Good stabilization is obtained at proportions within the range from about 15 to about 25 parts of calcium benzoate, from about 10 to about 25 parts of the zinc salts, and from about 50 to about 75 parts of glycerol. Preferably, the stabilizer system contains 3 parts of calcium benzoate, 2 parts of the zinc salts, and 10 parts of glycerol. It will be understood that the term "salts" refers to the salts of the mixed fatty acids derived from edible fats and oils. Exemplary are the mixed fatty acids derived from tallow, coconut oil, cottonseed oil, soybean oil, corn oil and peanut oil. The oils from which the fatty acids are derived may be hydrogenated, if desired. Also useful are the distilled fractionated fatty acid mixtures derived from such oils.

The amount of the stabilizer system should be sufficient to permit heating of the stabilized polyvinyl chloride resin composition at 375° F. for at least one-half hour without the development of heat decomposition. Usually, from 3 to 6% stabilizer system by weight of the resin will be sufficient to meet most needs in use. Good resistance to heat deterioration is obtainable employing only small amounts of the stabilizer system, as little as 1% by weight of the resin. The more stabilizer employed, the better the resistance to heat deterioration, up to amounts of 6% by weight of the resin. Beyond this, the stabilization effect may not be greatly enhanced, and such larger amounts may accordingly be wasteful. However, amounts up to 10% can be employed if desired.

The invention is applicable to any polyvinyl chloride resin. The term "polyvinyl chloride" as used herein is inclusive not only of polyvinyl chloride homopolymers but also of copolymers of vinyl chloride in a major proportion and other copolymerizable monomers in a minor proportion, such as copolymers of vinyl chloride and vinyl acetate, copolymers of vinyl chloride and vinylidene chloride, copolymers of vinyl chloride with maleic or fumaric acid, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The invention is of particular application to the stabilization of rigid polyvinyl chloride resin compositions, that is, resin compositions which are formulated to withstand high temperatures, of the order of 375° F. and higher. Plasticization of such polymers is permissible provided this does not reduce the softening point of the resin to below the temperature to which it must be subjected. However, the stabilizer systems of the invention can be used with plasticized polyvinyl chloride resin compositions of conventional formulation where high softening point is not a requisite. Conventional plasticizers well known to those skilled in the art can be employed such as, for example, dioctyl phthalate and octyl diphenyl phosphate.

The preparation of the stabilized resin composition is easily accomplished by conventional procedures. The selected stabilizer system ordinarily is blended with the polyvinyl chloride resin using, for instance, plastic mixing rollers at a temperature at which the mix is fluid and thorough blending facilitated, milling the stabilizer system with the resin on a two roll mill at from 300 to 400° F. for a time sufficient to form a homogeneous sheet. The plasticizer, if one is employed, is incorporated with the stabilizer. Usually, five minutes milling time is adequate. After the mass is uniform, it is sheeted in the usual way.

The following examples in the opinion of the inventors constitute the preferred embodiments of their invention.

EXAMPLE 1

Plastic composition:                                     Parts by weight
    Geon 103 Ep (homopolymer of polyvinyl chloride) _____ 150
    Stabilizer system as noted in Table I _____ 9

The stabilizers were blended with the polyvinyl chloride on a two roll mill up to 375° F. and then held in an oven at 375° F. to determine their heat stability. The discoloration was noted and is reported in Table I below.

parts by weight with 150 parts by weight of Geon 103 Ep resin. The composition was then held in an oven at 375° F. to determine its heat stability. The color noted was as reported in Table II below.

*Table I*

|  |  | Parts per 150 Parts of Resin | Heat Discoloration for Minutes of Heating | | | | | |
|---|---|---|---|---|---|---|---|---|
|  |  |  | Initial | 15 | 30 | 45 | 60 | 75 |
|  | Control—no stabilizer |  | White | Dark brown | Black | Black | Black | Black. |
| I | Calcium Benzoate | 9 | Medium brown | do | Dark brown | do | do | Do. |
| II | Zinc Salts of Tallow Fatty Acids | 9 | White | Black | Black | do | do | Do. |
| III | Glycerol | 9 | do | Dark red | do | do | do | Do. |
| IV | {Calcium Benzoate<br>Zinc Salts of Tallow Fatty Acids} | 4.5<br>4.5 | do | Black | do | do | do | Do. |
| V | {Calcium Benzoate<br>Glycerol} | 4.5<br>4.5 | do | Reddish brown | Dark reddish brown. | Dark reddish brown. | Dark reddish brown. | Do. |
| VI | {Zinc Salts of Tallow Fatty Acids<br>Glycerol} | 3<br>6 | Cream | Black | Black | Black | Black | Do. |
| VII | {Calcium Benzoate<br>Zinc Salts of Tallow Fatty Acids<br>Glycerol} | 2.35<br>1.15<br>5.5 | White | Pale yellow | Yellow | Yellow | Dark yellow | Do. |
| VIII | {Calcium Salts of Tallow Fatty Acids<br>Zinc Salts of Tallow Fatty Acids<br>Glycerol} | 3<br>3<br>3 | do | Yellow | Yellow-black edges. | Black | Black | Do. |
| IX | {Calcium Salts of Tallow Fatty Acids<br>Zinc Salts of Tallow Fatty Acids<br>Glycerol} | 1.8<br>1.2<br>6.0 | do | do | Dark brown | do | do | Do. |

It is apparent from the above results that the stabilizer system of the invention in the proportions indicated in VII gave by far the best results. Calcium benzoate, zinc salts of mixed tallow fatty acids, and glycerol alone, I, II and III, respectively, were completely ineffective, being no better than the control. The combinations of two of these, calcium benzoate and the zinc salts of tallow fatty acids, calcium benzoate and glycerol, IV, V and VI, respectively, gave a slight improvement in heat resistance, but not enough to be acceptable. The difference between these and VII is very striking.

VIII shows that the mixed calcium and zinc salts of mixed tallow fatty acids are not as effective as the mixture of calcium benzoate and the zinc salts of these acids. This shows the importance of the calcium benzoate.

The very high heat resistance at 375° F. is, of course, a measure of the heat resistance at ordinary atmospheric temperatures and shows that the compositions of the invention have a useful life under such conditions with at least four times that of the other compositions tested. This is a remarkable improvement.

Tests showed sample VII to be nontoxic.

It is apparent from the above results that the stabilizer system of the invention gave a distinct improvement in preventing initial discoloration up to 60 minutes of heating, whereas the other stabilizer combinations were in nearly all cases effective only for 15 minutes of heating, and in no case as much as 30 minutes of heating.

EXAMPLE 2

A series of compositions was made up as in Example 1 employing a copolymer of 96% vinyl chloride and 4% vinyl acetate. Similar results were obtained.

EXAMPLE 3

A stabilizer was prepared composed of calcium benzoate 1.35 parts, zinc salts of mixed tallow fatty acids 0.90 part, and glycerol 6.75 parts. This stabilizer system was used in accordance with Example 1 in the amount of 9

*Table II*

Initial—White
After 15 minutes of heating—Pale yellow
After 30 minutes of heating—Yellow
After 45 minutes of heating—Dark yellow
After 60 minutes of heating—Reddish brown
After 75 minutes of heating—Black
After 90 minutes of heating—Black In these proportions, the stabilizer system does not impart quite as good heat resistance when used in the same amount as sample VII of Table I. However, better stabilization could be obtained by using more of the stabilizer system by weight of the resin.

EXAMPLE 4

A stabilizer system was prepared composed of calcium benzoate 2.5 parts, zinc salts of mixed tallow fatty acids 2.5 parts, and glycerol 4.5 parts. This stabilizer system was used in accordance with Example 1 in the amount of 9 parts by weight with 150 parts by weight of Geon 103 Ep resin. The composition was then held in an oven at 375° F. to determine its heat stability. The color noted was as reported in Table III below.

*Table III*

Initial—White
After 15 minutes of heating—Pale yellow
After 30 minutes of heating—Pale yellow
After 45 minutes of heating—Pale yellow
After 60 minutes of heating—Pale yellow with black edges
After 75 minutes of heating—Dark yellow with black edges
After 90 minutes of heating—Dark yellow with black edges
After 105 minutes of heating—Black This stabilizer system is practically as good as VII of Table I, giving stabilization up to 45 minutes at 375° F.

EXAMPLE 5

The series of formulations of Example 1 were prepared again, substituting zinc salts of the mixed fatty acids derived from coconut oil for the tallow fatty acids used in that example. The same results were obtained. The composition corresponding to sample VII imparted adequate heat resistance for 60 minutes of heating at 375° F., whereas the other compositions tested gave stabilization only for about 15 minutes of heating.

EXAMPLE 6

The series of formulations of Example 1 were prepared again, substituting zinc salts of the mixed fatty acids derived from hydrogenated cottonseed oil for the tallow fatty acids used in that example. The same results were obtained. The composition corresponding to sample VII imparted adequate heat resistance for 60 minutes of heating at 375° F., whereas the other compositions tested gave stabilization only for about 15 minutes of heating.

EXAMPLE 7

The series of formulations of Example 1 were prepared again, substituting zinc salts of the mixed fatty acids derived from hydrogenated cord oil for the tallow fatty acids used in that example. The same results were obtained. The composition corresponding to sample VII imparted adequate heat resistance for 60 minutes of heating at 375° F., whereas the other compositions tested gave stabilization only for about 15 minutes of heating.

EXAMPLE 8

The series of formulations of Example 1 were prepared again, substituting zinc salts of the mixed fatty acids derived from peanut oil for the tallow fatty acids used in that example. The same results were obtained. The composition corresponding to sample VII imparted adequate heat resistance for 60 minutes of heating at 375° F., whereas the other compositions tested gave stabilization only for about 15 minutes of heating.

EXAMPLE 9

A composition was prepared exactly as in Example 1, employing as the stabilizer system a mixture of 3 parts calcium benzoate, 2 parts zinc salts of tallow fatty acids, and 10 parts of pentaerythritol. This stabilizer system was used in the amount of 9 parts by weight with 150 parts by weight of Geon 103 Ep resin. The stabilization obtained when the resin composition was held in an oven at 375° F. was equivalent to that of sample VII of Table I. Thus, pentaerythritol is an equivalent of glycerol, but it would not be employed in the stabilizer systems of the invention at the present time, because pentaerythritol is not accepted as safe to use in food packaging.

We claim:

1. A polyvinyl chloride resin stabilizer composition capable of improving the resistance of the resin to heat deterioration when heated at 375° F., consisting essentially of calcium benzoate, the zinc salts of mixed fatty acids derived from edible fats and oils, and glycerol, in the proportions of from about 15 to about 25 parts of calcium benzoate, from about 10 to about 25 parts of the zinc salts and from about 50 to about 75 parts of glycerol.

2. A polyvinyl chloride resin stabilizer composition in accordance with claim 1 in which the calcium benzoate, zinc salts and glycerol are in the proportion of 3:2:10.

3. A polyvinyl chloride resin stabilizer composition in accordance with claim 1 in which the fatty acids are tallow fatty acids.

4. A polyvinyl chloride resin stabilizer composition in accordance with claim 1 in which the fatty acids are coconut oil fatty acids.

5. A polyvinyl chloride resin stabilizer composition in accordance with claim 1 in which the fatty acids are hydrogenated cottonseed oil fatty acids.

6. A polyvinyl chloride resin stabilizer composition in accordance with claim 1 in which the fatty acids are hydrogenated corn oil fatty acids.

7. A polyvinyl chloride resin stabilizer composition in accordance with claim 1 in which the fatty acids are peanut oil fatty acids.

8. A polyvinyl chloride resin composition having improved resistance to heat deterioration, consisting essentially of a polyvinyl chloride resin, and a stabilizer composition consisting essentially of calcium benzoate, the zinc salts of mixed fatty acids derived from edible fats and oils, and glycerol, in the proportions of from about 15 to about 25 parts of calcium benzoate, from about 10 to about 25 parts of the zinc salts and from about 50 to about 75 parts of glycerol, the said stabilizer composition being present in an amount to improve resistance to heat deterioration when the composition is heated at 375° F.

9. A polyvinyl chloride resin composition in accordance with claim 8 in which the polyvinyl chloride resin is a polyvinyl chloride homopolymer.

10. A polyvinyl chloride resin composition in accordance with claim 8 in which the polyvinyl chloride resin is a copolymer of vinyl chloride and vinyl acetate.

11. A polyvinyl chloride resin composition in accordance with claim 8 in which the calcium salts, zinc salts and glycerol are in the proportion of 3:2:10.

12. A polyvinyl chloride composition in accordance with claim 8 in which the fatty acids are tallow fatty acids.

13. A polyvinyl chloride resin composition in accordance with claim 8 in which the fatty acids are coconut oil fatty acids.

14. A polyvinyl chloride resin composition in accordance with claim 8 in which the fatty acids are hydrogenated cotton seed oil fatty acids.

15. A polyvinyl chloride resin composition in accordance with claim 8 in which the fatty acids are hydrogenated corn oil fatty acids.

16. A polyvinyl chloride resin composition in accordance with claim 8 in which the fatty acids are peanut oil fatty acids.

References Cited in the file of this patent

UNITED STATES PATENTS

| | | |
|---|---|---|
| 2,711,401 | Lally | June 21, 1955 |
| 2,935,491 | Mack | May 3, 1960 |